(12) United States Patent
Lipay et al.

(10) Patent No.: US 10,836,034 B2
(45) Date of Patent: Nov. 17, 2020

(54) SYSTEMS, DEVICES, ARTICLES, AND METHODS FOR PREHENSION OF ITEMS

(71) Applicant: Kindred Systems Inc., San Francisco, CA (US)

(72) Inventors: Petr Lipay, San Mateo, CA (US); Richard Chad Cogar, Portage la Prairie (CA)

(73) Assignee: Kindred Systems Inc., San Francisco, CA (US)

(*) Notice: Subject to any disclaimer, the term of this patent is extended or adjusted under 35 U.S.C. 154(b) by 302 days.

(21) Appl. No.: 16/030,378

(22) Filed: Jul. 9, 2018

(65) Prior Publication Data

US 2019/0009414 A1 Jan. 10, 2019

Related U.S. Application Data

(60) Provisional application No. 62/530,702, filed on Jul. 10, 2017.

(51) Int. Cl.
| | |
|---|---|
| *B25J 9/16* | (2006.01) |
| *B25J 13/02* | (2006.01) |
| *B25J 15/00* | (2006.01) |
| *B25J 15/02* | (2006.01) |

(52) U.S. Cl.
CPC .......... *B25J 9/1612* (2013.01); *B25J 9/1689* (2013.01); *B25J 9/1694* (2013.01); *B25J 13/02* (2013.01); *B25J 15/0009* (2013.01); *B25J 15/02* (2013.01); *G05B 2219/39474* (2013.01); *G05B 2219/39514* (2013.01)

(58) Field of Classification Search
CPC .... B25J 13/02; B25J 15/0009; B25J 15/0023; B25J 15/0028–0047; B25J 15/02–0293; B25J 15/08–12; B25J 9/1612; B25J 9/1694; G05B 2219/39474; G05B 2219/39466; G05B 2219/39531; G05B 2219/39534; G05B 2219/39535; G05B 2219/39509; G05B 2219/39513; G05B 2219/39514; G05B 2219/39547
See application file for complete search history.

(56) References Cited

U.S. PATENT DOCUMENTS

| | | | | |
|---|---|---|---|---|
| 2011/0137463 | A1* | 6/2011 | Alcazar | B25J 9/1669 700/259 |
| 2014/0156066 | A1* | 6/2014 | Sakano | B25J 9/1633 700/245 |
| 2014/0324218 | A1 | 10/2014 | Suzuki | |
| 2016/0207195 | A1 | 7/2016 | Eto et al. | |
| 2017/0282363 | A1* | 10/2017 | Yamada | B25J 15/106 |

OTHER PUBLICATIONS

International Search Report and Written Opinion, dated Oct. 1, 2018, for International Application No. PCT/CA2018/050842, 12 pages.
Bergeron et al., "Systems, Devices, Articles, and Methods for Prehension," U.S. Appl. No. 62/515,910, filed Jun. 6, 2017, 58 pages.

* cited by examiner

*Primary Examiner* — Spencer D Patton
(74) *Attorney, Agent, or Firm* — Seed IP Law Group LLP

(57) ABSTRACT

A system and method of determining a grasp type of an end-effector of a robot when interacting with an item wherein a plurality of velocity values of the end-effector at various positions of its movement are collected and used to determine the grasp type when a given velocity value is below a predetermined threshold.

20 Claims, 9 Drawing Sheets

SYSTEMS, DEVICES, ARTICLES, AND METHODS FOR PREHENSION OF ITEMS

TECHNICAL FIELD

This disclosure generally relates to the field(s) of operation of robots, manipulation of items by robots, data collection, and/or machine learning.

BACKGROUND

Description of the Related Art

Robots

Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

Machine Learning

A computer, which is a machine, can perform or succeed at one or more related tasks as defined by a measure. The computer learns if after exposure to information characterizing an event the computer improves under the measure at performing the one or more related tasks. Further, the computer learns without updates to any processor-executable instructions by imperative programming.

End-Effector

An end-effector or end of arm tool is a device attached to a robotic arm, manipulator, or appendage designed or structured to interact with an environment. Examples of end-effectors include grippers or graspers. End-effectors for robot operating in unstructured environments are devices of complex design. Ideally, these can perform many tasks, including for example grasp or grip or otherwise physically releasably engage or interact with an item or object. A grasp includes static and dynamic end-effector posture or poses by which an item can be securely held, or otherwise releasably engaged, by one or more end-effectors.

BRIEF SUMMARY

A system may be summarized as including a robot that includes an end-effector, at least one sensor, at least one processor communicatively coupled to the end-effector and the at least one sensor, and at least one nontransitory processor-readable storage device communicatively coupled to the at least one processor. The at least one nontransitory processor-readable storage device stores processor-executable instructions which, when executed by the at least one processor, cause the at least one processor to cause the end-effector to at least attempt to close on an item, receive a plurality of position values for the end-effector from the at least one sensor, and receive a plurality of velocity values for the end-effector. A respective velocity value included in the plurality of velocity values is associated with a respective position value included in the plurality of position values. The processor-executable instructions which, when executed by the at least one processor, cause the at least one processor to: determine a grasp type when a first velocity value included in the plurality of velocity values is below a first threshold value, and create at least one output signal that includes information that represents the determined grasp type.

A method of operation for a system including at least one processor, at least one sensor in communication with the at least one processor, and a robot including an end-effector in communication with the at least one processor. The method may be summarized as including causing, by the at least one processor, the end-effector to at least attempt to close on an item, receiving, by the at least one processor, a plurality of position values for the end-effector from the at least one sensor, and receiving, by the at least one processor, a plurality of velocity values for the end-effector. A respective velocity value included in the plurality of velocity values is associated with a respective position value included in the plurality of position values. The method including determining, by the at least one processor, a grasp type when a first velocity value included in the plurality of velocity values is below a first threshold value, and creating at least one output signal that includes information that represents the grasp type.

A system including at least one end-effector may be summarized substantially as described and illustrated herein.

A device may be summarized substantially as described and illustrated herein.

A processor-readable storage device including processor-executable instructions which when executed causes a processor to cause an end-effector to operate substantially as described and illustrated herein.

A method of operation for a robotic system substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

Systems, devices, articles, and methods are described in greater detail herein with reference to the following figures in which.

DETAILED DESCRIPTION

Figure 1:
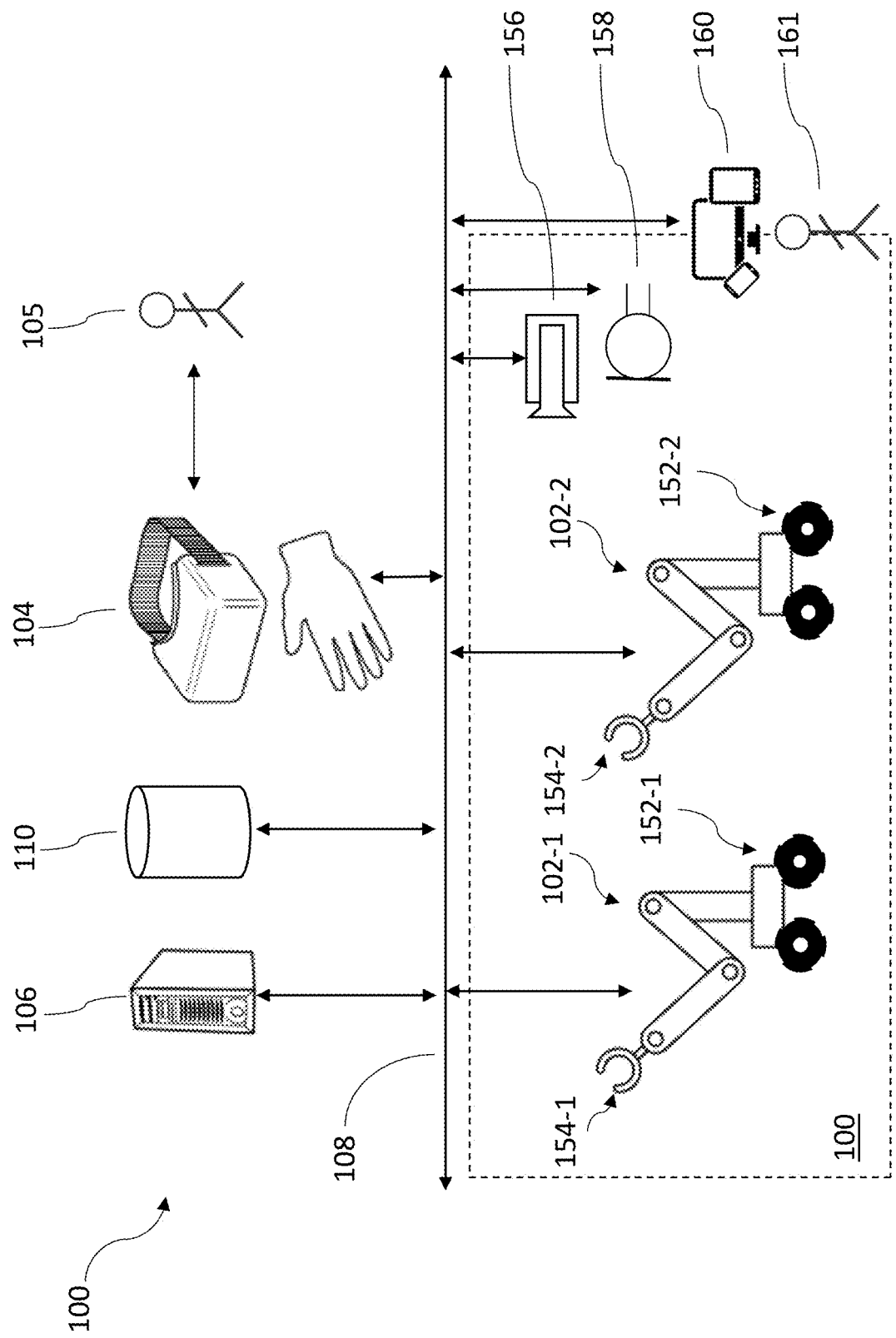
FIG. 1 is a schematic diagram illustrating a portion of a robotic system.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end-effectors and/or robotics, such as processors, sensors, storage devices, network interfaces, workpieces, tensile members, fasteners, electrical connectors, and the like are not shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an action" includes an action, or two or more actions. It should also be noted that the term "or" is generally employed in its sense including "and/or" unless the content clearly dictates otherwise.

The headings provided herein are for convenience only and do not interpret the scope or meaning of the embodiments.

A robot (e.g., arm and end-effector) may be directed to grasp, releasably engage, or otherwise handle various items that have different tangible properties. Further, some of these tangible properties could be different to those encountered in prior operations, e.g., during training. The grasp the end-effector has on the item may not conform to standards for a system, robot, end-effector, item or the like. For example, the item may be damaged or dropped when inappropriately handled by the robotic end-effector.

Disclosed herein are systems, devices, articles, and methods in which a controller receives position data and velocity data for the operation of one or more end-effectors, and is able to detect two or more types of grasp. The position data and velocity data may be received from sensors on the end-effector, e.g., a mechanical gripper. The position data and velocity data relates to the operation of the end-effector and represents positions of two or more parts of the end-effector relative to each other. The two or more types of grasp may include a failure to grasp an item, a grasp of a bag contaminating the item, or a grasp of a wrong part of the item. When the end-effector attempts a full close operation and the velocity data shows one or more material parts of the end-effector are no longer in motion, then the position data can be used to automate selection of a grasp type. For example, the end-effector is fully closed (indicating it has failed to close on the item or the item or a part there of is thin, e.g., a polyethylene bag). Or the end-effector is still partially open (indicating a larger item, e.g., rigid object is propping the end-effector open). A controller may use the grasp type to perform further operations, such as, generate a signal including processor-readable information that represents the grasp type, reject (e.g., fail to execute) robot control instructions based on the grasp type, or the like.

FIG. 1 shows an exemplary system 100 in accordance with the present systems, devices, articles, and methods. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater number of robots (102) and/or computer systems (106). In some implementations, system 100 includes a nontransitory computer- and processor-readable storage device 110.

Robots 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can selectively pilot one or both of robots 102. In human operator controlled (or piloted) mode, the human operator observes representations of sensor data, for example, video, audio, or haptic data received from one or more environmental sensors or internal sensors. The human operator then acts, conditioned by a perception of the representation of the data, and creates information or executable instructions to direct robots 102 or other robot(s). Robots 102 operate in, and receive data about, an environment 140 that comprises a physical space. The term "about" is employed here in the sense of represent, characterize, or summarize. The data about, an environment 140 is received from one or more sensors. In some implementations, the one or more sensors are on robots 102. In some implementations, the one or more sensors are external to robots 102, such as, camera 156, microphone 158.

In piloted mode, robots 102 execute robot control instructions in real-time (e.g., without added delay) as received from the operator interface 104 without taking into account or revision by the controller based on sensed information.

In some implementations, robots 102, operate without an operator interface 104 or human operator, e.g., autonomously. Robots 102 may operate in an autonomous control mode by executing autonomous control instructions. For example, computer system 106 or robots 102 can use sensor data from one or more sensors associated with operator generated robot control instructions and the operator generated robot control instructions from one or more times robots 102 was in piloted mode to generate autonomous robot control instructions for subsequent use. For example, by using deep learning techniques to extract features from the sensor data such that in autonomous mode the robots 102 autonomously recognize features and/or conditions in its environment and in response perform a defined act, set of acts, a task, or a pipeline of tasks. Exemplary acts include recognizing the presence of a red ball, or any colour ball, depending on the features extracted from the sensor data, and kicking the ball. In the absence of a ball, the robot executing the autonomous robot control instructions would not kick the air as if a ball was present.

In some implementations, the computer system 106 is a smaller processor based device like a mobile phone, single board computer, embedded computer, and the like. The computer system 106 may, in some instances, be termed or referred to interchangeably as a computer, server, or an analyzer 106. Computer system 106 may create autonomous control instructions for robots 102 or another robot. In some implementations, robots 102 autonomously recognize features and/or conditions in its environment as represented by a representation (e.g., presentation, depiction) of the environment, and in response being presented with the representation perform one or more actions or tasks. In some implementations, robots 102 autonomously recognize features and/or conditions in a representation of the environment.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robots 102 can replay or execute piloted robot control instructions in a human operator controlled (or piloted) mode. That is operate without sensor data and replay pilot data, so called, replay mode.

A robot, like robots 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads) to propel the robot in a physical space. An example of a motion subsystem is a set of drivetrain and wheels, such as, drivetrain and wheels 152-1, 152-2 (collectively 152) of robot 102-1, 102-2, respectively. The space does not need to be horizontal or terrestrial. Examples of spaces include water, air, underground, vertical spaces, outer space and the like.

A robot typically includes a manipulation subsystem comprising one or more appendages, such as, one or more arms and/or one or more associated end-effectors, arm and end-effector 154-1, 154-2 (collectively 154) of robot 102-1, 102-2. An end-effector is a device attached to a robotic arm designed to interact with the environment. End-effectors for robot operating in unstructured environments are devices of complex design. Ideally, these are capable of performing many tasks, including for example grasp, grip, physically releasably engage, or otherwise interact with an item.

System 100 includes a sensor subsystem comprising one or more sensors, such as, one or more imagers or cameras 156, and/or one or more microphones 158. (Robots 102 may include an onboard sensor subsystem. See examples, disclosed herein at, at least, FIG. 2 and FIG. 4.)

System 100 may include a sensor subsystem which acquires data that characterizes or represents the robots 102 in a context or scenario, and/or performing one or more tasks. The data includes environmental sensor information, or environment information, representative of environmental conditions external to robots 102.

System 100 includes an observer interface system. System 100 includes one or more observer interfaces 160 coupled to network or non-network communication channel 108. The observer interfaces 160 include input or output parts. An example of an output part is a display of explanatory text or a dynamic representation of robots 102 in a context or scenario. For example, the dynamic representation robot includes video and audio feed, for instance a computer-generated animation. Useful video and audio formats include H264 and Opus respectively. Example of an input part includes a WIMP interface. An observer 161 may observe or monitor the operation of system 100, robots 102 or the like from observer interfaces 160.

Figure 2:
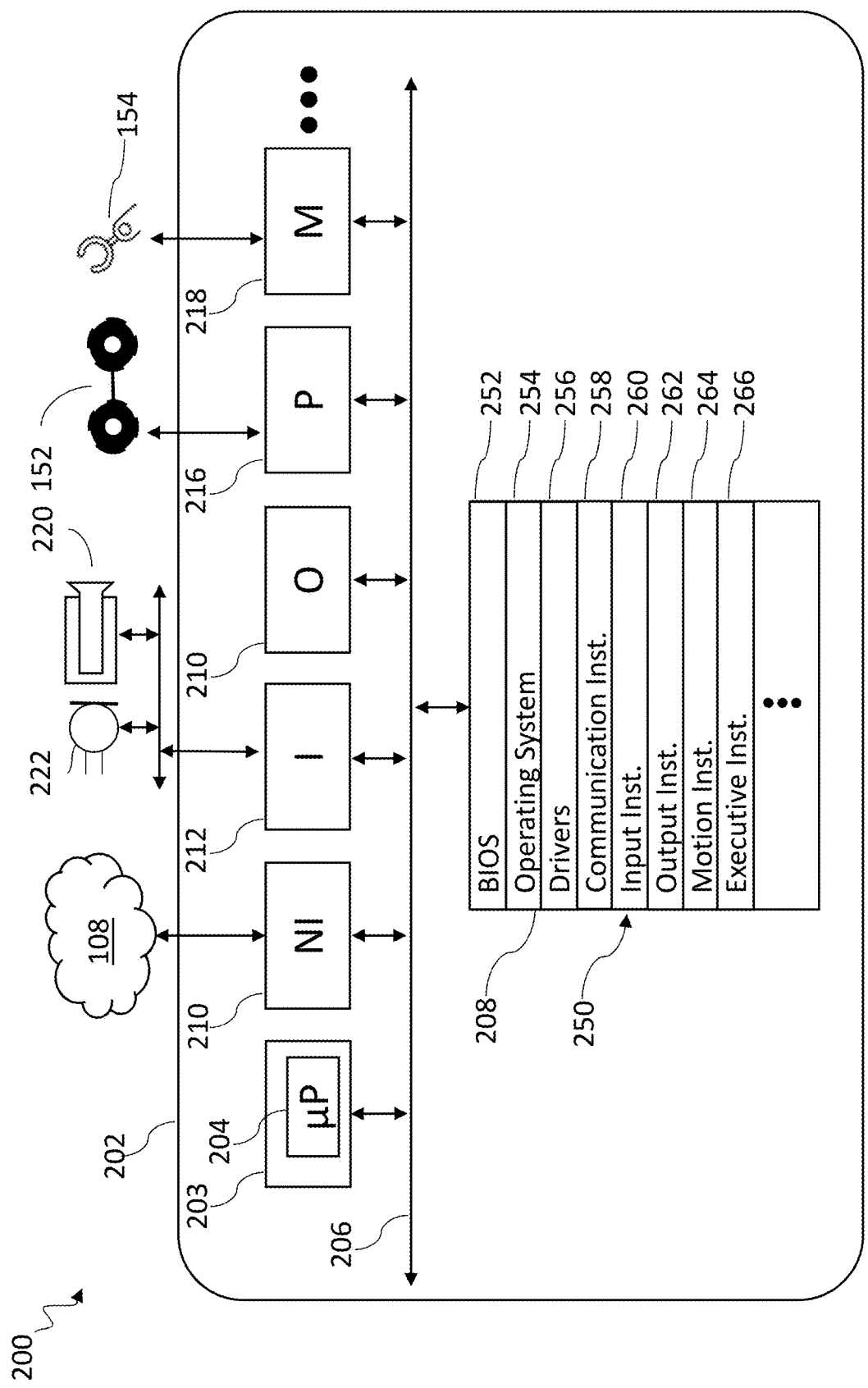
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with the present systems, devices, articles, and methods. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus (es) 206, storage device(s) 208, and network interface subsystem 210.

Robot 200 includes a network interface subsystem 210, e.g., a network interface device, that is communicatively coupled to bus(es) 206 and provides bi-directional communication with other systems (e.g., external systems external to the robot 200) via a network or non-network communication channel 108. The network interface subsystem 210 includes one or more buffers. Network interface subsystem 210 receives and sends data related partition of a plurality of items. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, and DCCP.

Robot 200 includes an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like. The input subsystem 212 may create environment information that represents the environment to the robot 200.

Robot 200 includes an output subsystem 214 comprising output devices, such as, speakers, lights, and displays. In some implementations, the output subsystem 214 includes a propulsion or motion subsystem 216 and/or a manipulation subsystem 218. The robot 200 may use the output subsystem 214 to perform one or more actions. A robot and associated devices performing an action is further described herein at, at least, FIG. 1, FIG. 2, FIG. 4, and FIG. 5. The one or more actions may performed in response to executing autonomous processor-executable robot control instructions, and operator generated processor-executable robot control instructions.

Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 includes a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, end-effectors, associated motors, solenoids, other actuators, linkages, drive-belts, and the like coupled and operable to cause the arm(s) and/or end-effector(s) to move within a range of motions. Manipulation subsystem 218 may include a manipulator, a mechanism extending from the robot (e.g., from body 202) comprising one or more joints and one or more links arranged in a kinematic chain. Manipulation subsystem 218 may include an end-effort disposed on a distal report of the manipulator. The end-effector, also called end-of-arm tooling, may perform work on an item or workpiece. Examples of end-effectors include gripper or actuator but also includes specialized wrenches, spray nozzles, probes, and the like. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, the output subsystem 214 includes propulsion or motion subsystem 216 and/or manipulation subsystem 218. In some implementations, the input subsystem 212 includes the network interface subsystem 210. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions, e.g., identify and manipulate items. Processor-executable instructions or data 250 can, for example, include a basic input/output system (BIOS) 252, an operating system 254, drivers 256, communication instructions or data 258, input instructions or data 260, output instructions or data 262, motion instructions or data 264, and executive instructions or data 266.

Exemplary operating systems for operating system 254 include ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions or data 264 guide robot 200 in moving within its environment via components in propulsion or motion subsystem 216. For example, processor-executable motion instructions or data 264 may perform motion planning, inverse kinematics, or other motion related tasks. Processor-executable motion instructions or data 264 may implement, in part, various methods described herein, including those in and in relation to FIGS. 6-9. The processor-executable motion instructions or data 264 may, when executed, generate processor-executable robot control instructions, which when executed, causes robot 200 to perform one or more actions. For example, the processor-executable motion instructions or data 264 may, when executed, cause the end-effector to close on an item.

The processor-executable executive instructions or data 266 guide the robot 200 in reasoning, problem solving, planning tasks, performing tasks, and the like. The processor-executable executive instructions or data 266, when executed, may guide the robot 200 to determine an action in view of environment information, simulation information, and augmented reality information. The processor-executable executive instructions or data 266 may implement, in part, various methods described herein, including those in and in relation to FIGS. 6-9.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 220 and microphone 222. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
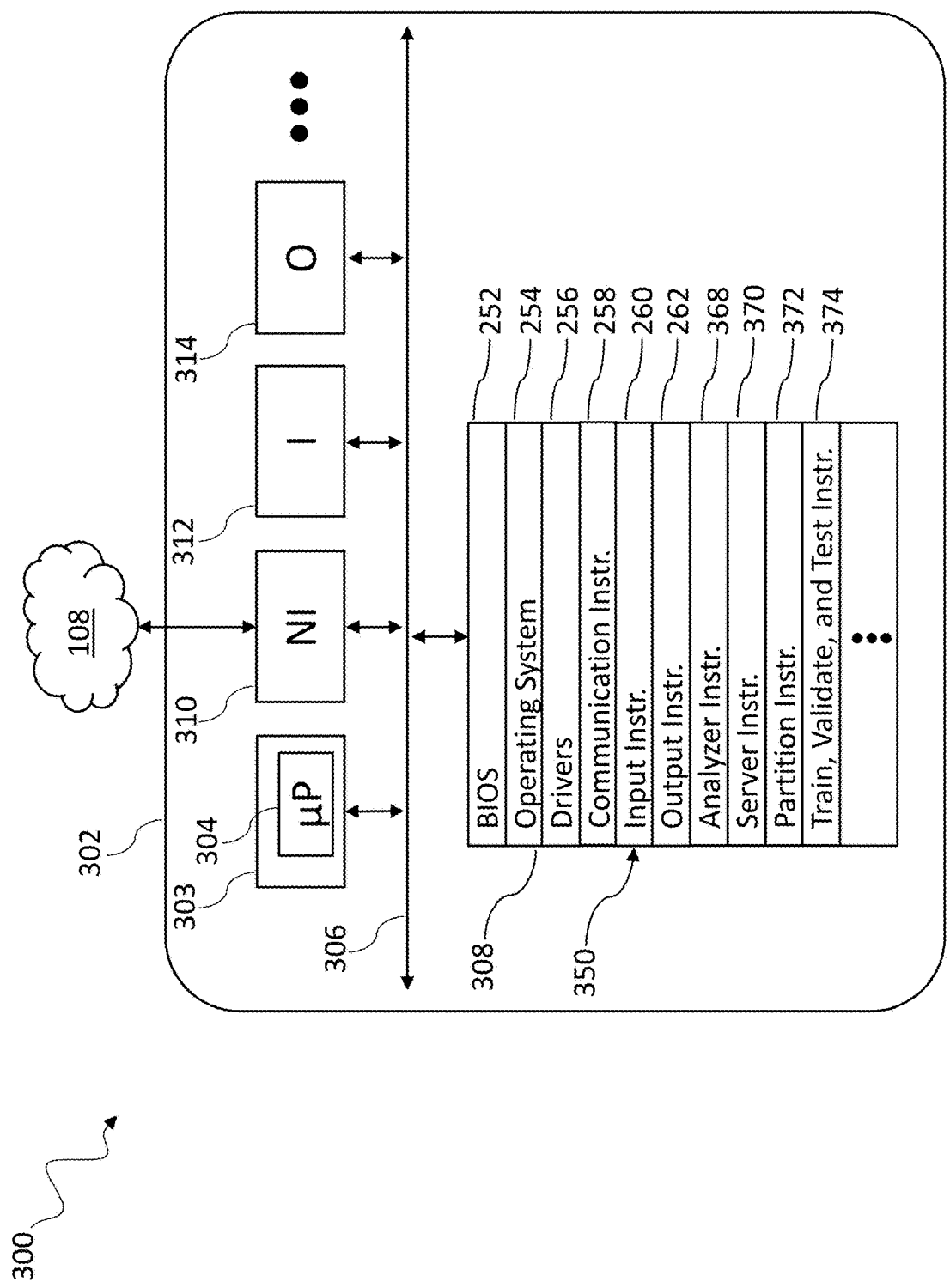
FIG. 3 is a schematic diagram illustrating an exemplary processor-based device suitable for inclusion in the system of FIG. 1.

FIG. 3 schematically shows exemplary parts of a system 300, including a processor, that may be used as computer system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 is communicatively coupled to bus(es) 306 and provides a bi-directional communicative coupler among system 300 and other systems (e.g., processor-based devices associated with observers, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to the processor(s) 304 via bus(es) 206.

Storage device(s) 308 includes or stores processor-executable instructions or data 350 associated with the operation of system 300, or system 100. Processor-executable instructions or data (even reference numbers 252-262) are described herein and with appropriate changes are applicable to system 300, e.g., absence of a motion subsystem. In various implementations, storage device(s) 308 includes or stores one or more of: processor-executable analyzer instructions or data 368, processor-executable server instructions or data 370, processor-executable partition instructions or data 372, and processor-executable train, validate, test instructions or data 374. The processor-executable analyzer instructions or data 368, processor-executable server instructions or data 370, processor-executable partition instructions or data 372, and processor-executable train, validate, test instructions or data 374 may implement, in part, various methods described herein, including those in and in relation to FIGS. 6-9

Processor-executable analyzer instructions or data 368, when executed by control subsystem 304, generates processor-executable robot control instructions, such as, autonomous robot control instructions. Processor-executable server instructions or data 370, when executed by processor(s) 304, guide system 300 to coordinate the operation of system 100, act as a mediator between robots 102, computer system 106, coordinate the operation of a system, e.g., a system including device 400, and the like. Processor-executable partition instructions or data 372, when executed by processor(s) 304, guide system 300 to partition items. The processor-executable partition instructions or data 372 may, in part, implement various systems, devices, articles, and methods described herein, including those in and in relation to FIGS. 6-9. The processor-executable partition instructions or data 372 may implement, in part, various methods described herein including method 600, method 700, method 800, and method 900.

The processor-executable train, validate, test instructions or data 374, when executed by processor(s) 304, guide system 300 to train, validate, and test an agent with augmented reality data. Processor-executable train, validate, test instructions or data 374 may, in part, implement various systems, devices, articles, and methods described herein, including those in and in relation to FIGS. 4-9. The processor-executable train, validate, test instructions or data 374, when executed, may implement, in part, various methods described herein including method 600, method 700, method 800, and method 900.

Figure 4:
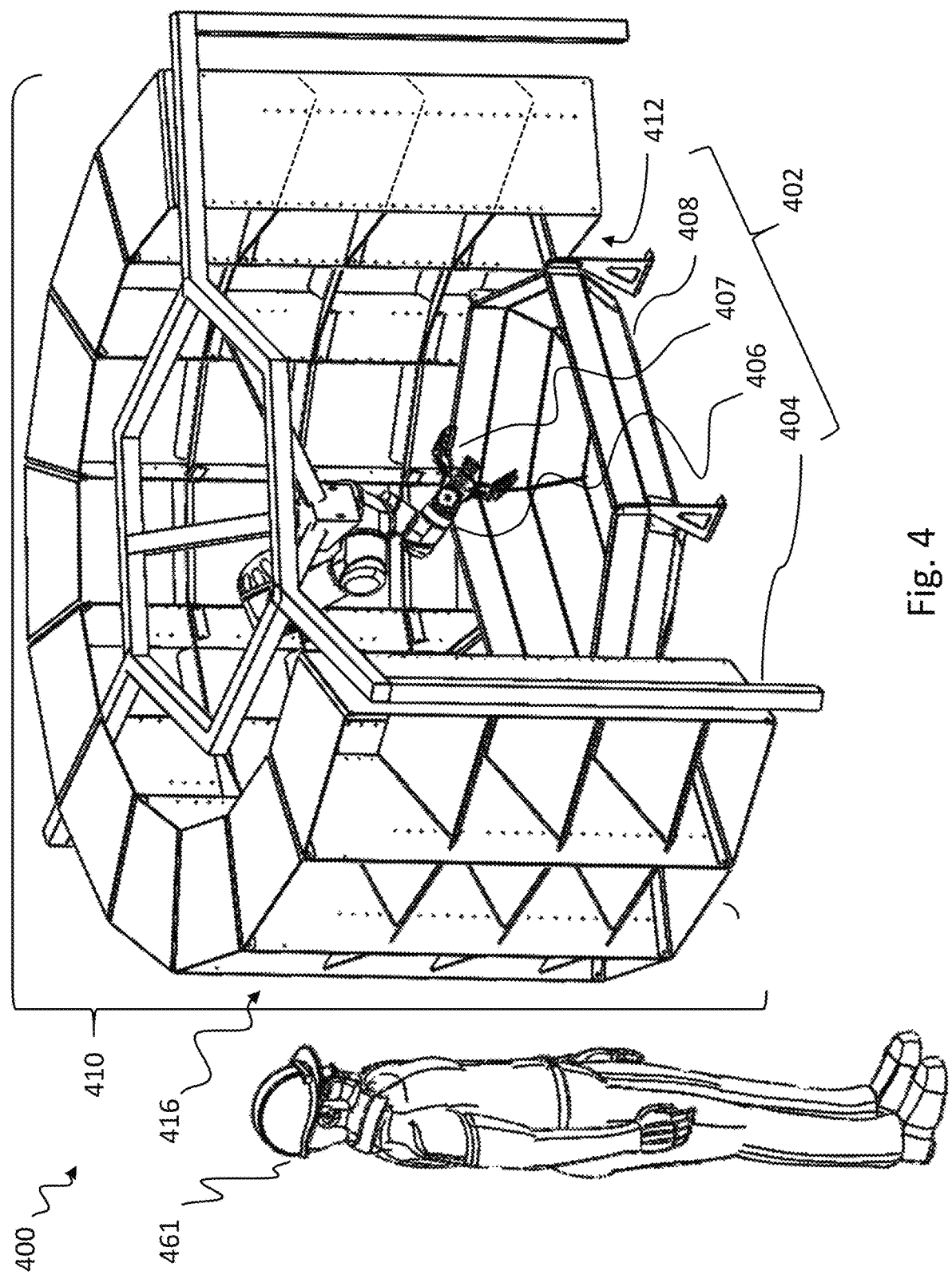
FIG. 4 illustrates, in a perspective view, an exemplary device that includes at least one arm and end-effector.

FIG. 4 illustrates, in a perspective view, an exemplary device 400 in accordance with the present systems, articles, and methods, along with a worker 461. Device 400 includes at least one end-effector 407.

Device 400 includes an input part 402 and an output part 410. In some implementations, input part 402 includes a frame 404 which may be coupled or connected to a base, e.g., floor, ground, or platform. One or more multi-joint manipulators 406, e.g., robotic arm, may be coupled or connected to frame 404. Manipulator(s) 406 may couple to at least one end-effector 407 distally disposed on manipulator(s) 406 relative to frame 404. Herein device 400 and methods described herein are described as being performed by manipulator and end-effector. However, device 400 and methods described herein, such as method 600, method 700, method 800, and method 900, may include at least one manipulator or end-effector.

Manipulator(s) 406 may be a lightweight six joint industrial robot arm, such as, a UR5™ from Universal Robots A/S of Odense, DK. The UR5™ has a lifting ability of 5 kg and have a working radius of 850 mm. Manipulator(s) 406 may be a multi-purpose industrial robot arm such as the LR Mate 200iD-7L™ from FANUC Corporation of Oshino, Yamanashi prefecture, JP with place of business in Rochester Hills, state of Michigan, US. The LR Mate 200iD-7L includes six joints and a reach of 911 mm. Manipulator(s) 406 may be sized to allow manipulator(s) 406 to move largely unimpeded by frame 404. The manipulator(s) 406 may be fitted with an end-effector such as an EZGRIPPER™ from Sake Robotics of Redwood City, state of California, US (not shown) or the end-effectors described in commonly assigned US provisional application, application Ser. No. 62/515,910, filed 2017 Jun. 6 (some examples shown herein at, at least, FIG. 5).

The manipulator(s) 406 and associated end-effector(s) 407 may move items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around output space 410. The output space may include a plurality of cubbies 412 that may be accessed from the opposite side 416.

A plurality of items may be disposed in input space 408. The plurality of items may be referred to as a batch or group, may be of two or more types, or may be associated with two or more specified or defined, partitions (i.e., parts) of the plurality of items. The plurality of items item may be added to input space 408 in tranches, e.g., one container at a time with intervening action by at least one processor or end-effector(s) 407. Device 400 may be used in a way such that as successive items are added to items already present in input space 408 the addition of items is regarded as correct when the added items partially or fully complete the batch. That is, when one or more items are present in input space 408 a correct procedure could be to only allow addition of further items to input space 408 when the further items complete the batch. For example, two containers may be placed or dumped into an input space 408. One worker 461 could provide the two containers or two different workers to provide the two containers including items. There could be some or no time separation between the adding items from the two containers.

Device 400 includes a plurality of reception spaces 412-1, 412-2, 412-3 (only three called out for clarity of drawing, collectively 412) proximate to input space 408 and manipulator(s) 406. For example, the end-effector(s) 407 and associated manipulator(s) 406 may be moveable to be at least proximate with the plurality of reception spaces 412. The end-effector(s) 407 and associated manipulator(s) 406 may move items from input space 408 to the plurality of reception spaces 412, or to, from, and around in input space 408. The end-effector(s) 407 and associated manipulator(s) 406 may grasp a first respective item from a plurality of items in input space 408. The end-effector(s) 407 and associated manipulator(s) 406 may transfer the first respective item to a first reception space in the plurality of reception spaces 412, e.g., space 412-1. The end-effector(s) 407 and associated manipulator(s) 406 may grasp a second respective item from the plurality of items, and may transfer the second respective item to the first reception space (e.g., space 412-1) or a second reception space (e.g., space 412-2, or 412-3).

Device 400 may include a plurality of extraction spaces 416-1, 416-2, 416-3 (only three called out for clarity of drawing, collectively 416). The plurality of extraction spaces 416 may correspond to (e.g., one to one) the plurality of reception spaces 412. For example, reception space 412-1 may correspond to extraction space 416-1, for instance the reception space 412-1 corresponding extraction space 416-1 may be coupled via a passage therebetween or otherwise provide access for items placed in the reception space 412-1 to transit to the corresponding extraction space 416-1. That is an item transferred from input space 408 to reception space 412-1 may be retrieved from extraction space 416-1. The plurality of extraction spaces 416 may overlap to (e.g., one to one) the plurality of reception spaces 412. A pair of one reception space and one extraction space may include an overlapping volume or area. The one reception space may be accessed via a first opening and the one extraction space may be accessed via a second opening.

Device 400 may include a plurality of septums 422-1 (only one called out for clarity of drawing). A respective septum, e.g., septum 422-1, may be disposed between and separate a respective pair of reception spaces 412, or a respective pair of extraction spaces 416. That is, a septum 422-1 may define a boundary between a pair of spaces, e.g., separate a respective pair of reception spaces 412, a respective pair of extraction spaces 416, or a reception space and an extraction space.

Device 400 may include a plurality of slides 424-1, 424-2 (only two called out for clarity of drawing, collectively 424). A respective slide, e.g., slide 424-1, may be disposed between and couple a reception space and an extraction space, e.g., reception space 412-1 and extraction space 416-1. That, is a slide included in the plurality of slides 424 may allow for one or more items to be transferred (e.g., slide) from a reception space and a corresponding extraction space. The slide may be arranged such that end-effector(s) 407 may release an item in a reception space and a worker, such as worker 461, may extract or retrieve the item from a corresponding extraction space.

Figure 5:
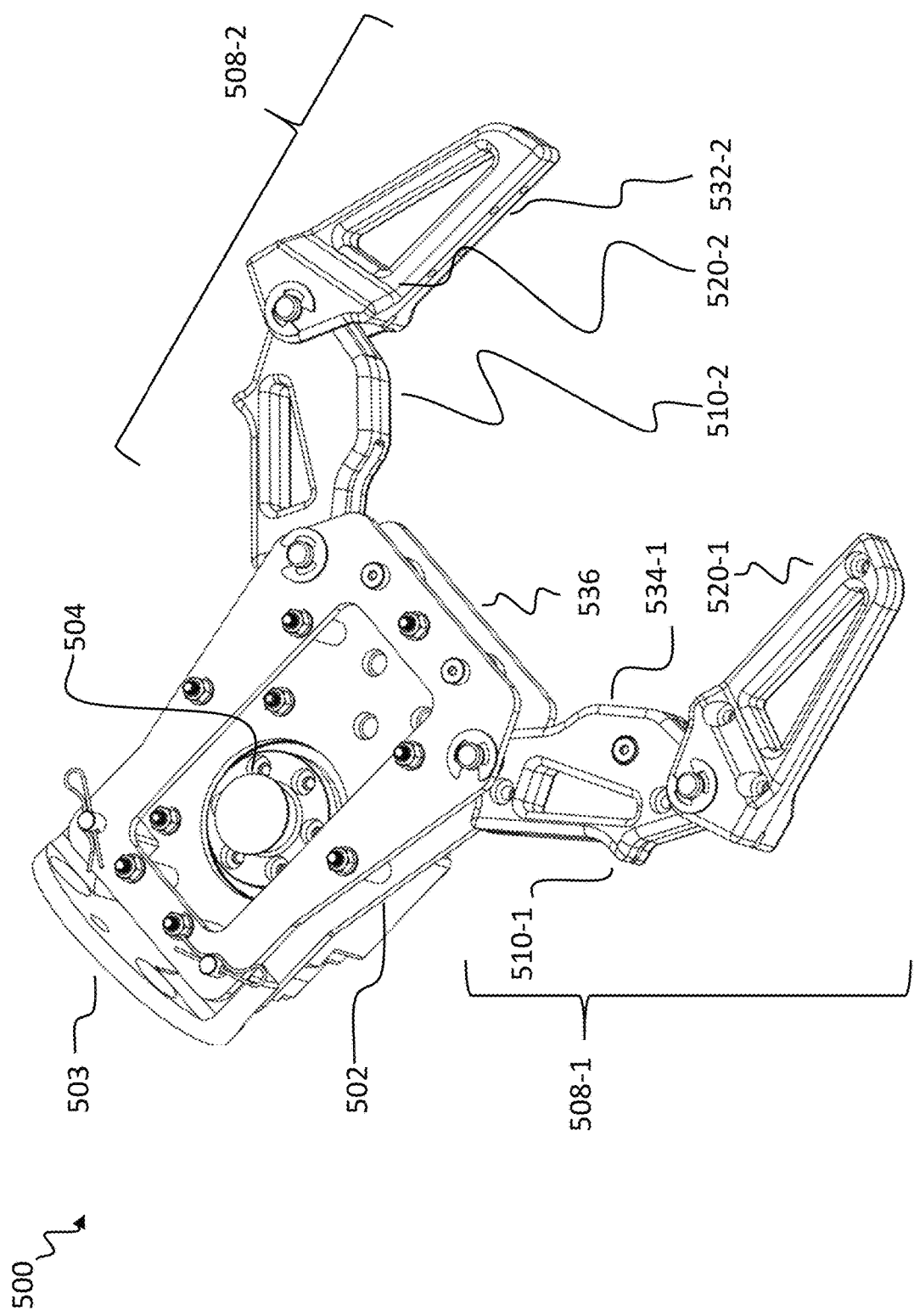
FIG. 5 illustrates, in a perspective view, an exemplary device that may be included in an end-effector.

FIG. 5 illustrates an exemplary device 500 that may serve as or part of an end-effector, such as, end-effector 407 show in FIG. 4. Device 500 includes base 502, a body to which other components may be coupled, e.g., connected. Base 502 may be made of metal, plastic, or composite in one or more parts. Base 502 is a link including two or more nodes. Device 500 may be coupled to another component such as manipulator(s) 406 or robot 102-1. For example, device 500 may include an attachment point 503, which may be part of base 502, or a separate body coupled to base 502, e.g., rigidly coupled.

In at least one implementation, device 500 includes an actuator 504 coupled to base 502. The actuator 504 could be a rotatory actuator, such as a servo or motor coupled to a windlass directly or via a gear train, shaft, belt, chain or the like. Actuator 504 could be a linear actuator. One or more tensile members may be coupled to and pulled by actuator 504. Actuator 504 may draw in or pull, or release or let out a tensile member.

In at least one implementation, device 500 includes a plurality of fingers 508. In some implementations, the fingers 508 are underactuated. In some implementations, the plurality of fingers 508 includes two fingers. In some implementations, a first finger in the plurality of fingers 508 opposes a second finger in the plurality of fingers 508.

A respective finger in the plurality of fingers 508 includes a proximal link 510-1, 510-2 (collectively 510) that may be described as phalange or segment. Proximal link 510, such as proximal link 510-1 and 510-2, is a body and specifically a compressive member. Proximal link 510 includes at least two nodes for that can act as couplers to other links, such as, base 502.

A respective finger in the plurality of fingers 508 includes a distal link 520-1 and 520-2 (collectively 520) that may be described as phalange or segment. Distal link 520, such as distal link 520-1 and 520-2, includes at least two nodes that can act as couplers to other links, such as, proximal link 510 or other components, such as, actuator 504 via a tensile member. In some implementations, one or more links in the plurality of fingers 508 includes pads disposed on the volar side of the link, such as, links 510 and 520. The volar area of device 500 is defined below. For example, distal link 520-2 may be associated with a distal volar pad, e.g., 532-2, included or coupled to the volar side of a distal link 520-2. In some implementations, proximal link 510-1 is associated with a proximal volar pad 534-1 included, or coupled to, the volar side of proximal link 510-1. The pads disposed on the volar side of links such as a distal volar pad, e.g., 532-2 may include ingressive devices or surface treatment such as pins, spines, scales, or ridges that physically penetrate a surface of the item. The pads disposed on the volar side of links include contigutive devices or surface treatment such as coating, liquids, smoothed surface, or ridges that creates an adhesion by glue, surface tension or the like. The pads disposed on the volar side of links such as a distal volar pad, e.g., 532-2 may include a plurality of tactile elements or tactels.

Device 500 may include a rest 536 that serve as a palm in device 500 but defines what looks like the edge of a purlicue in the human hand, i.e., space between finger and thumb. The rest 536 may be defined by part of base 502 or at least one body coupled to base 502. Rest 536 defines the volar area and thus the volar direction for device 500.

Figure 6:
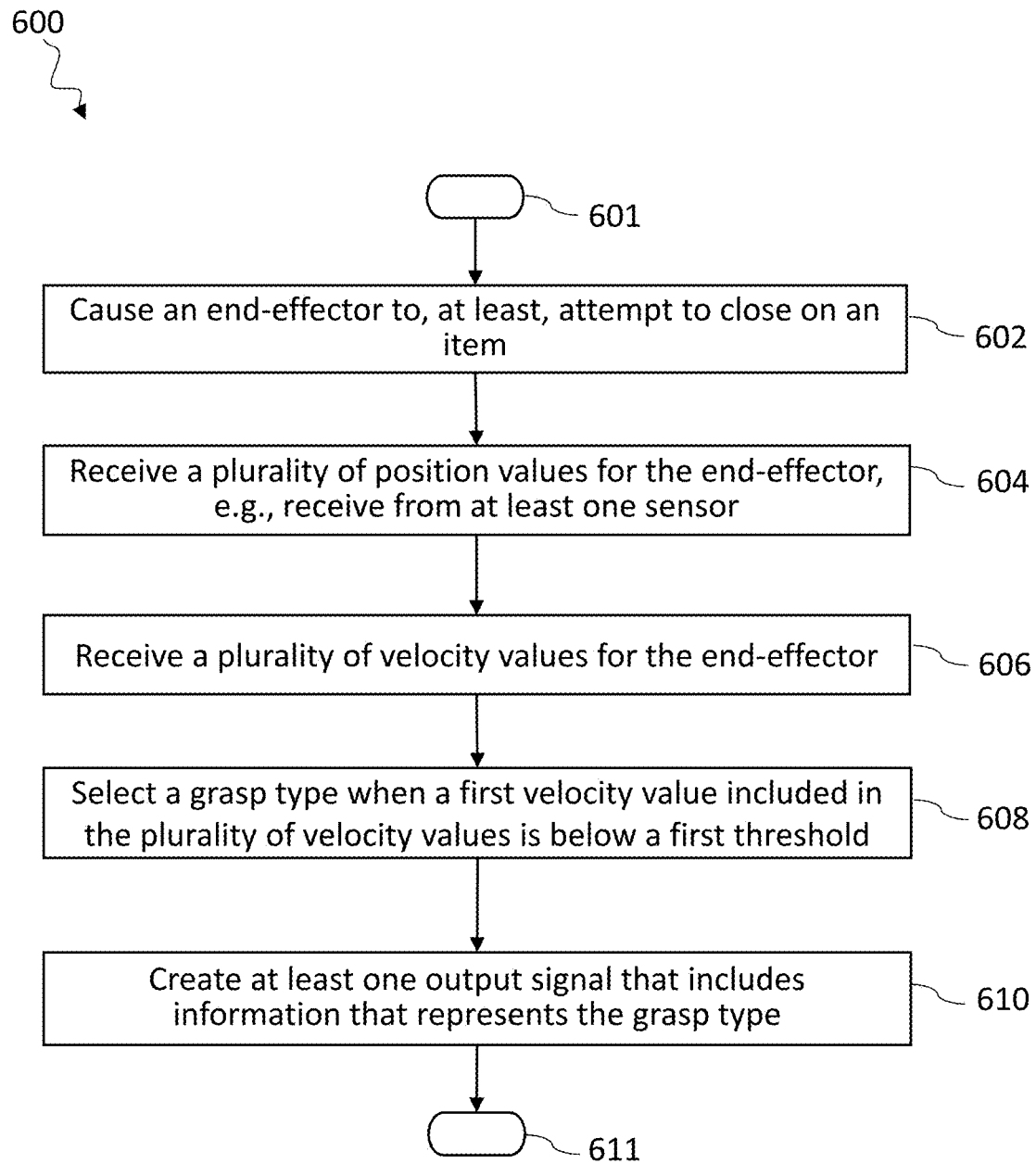
FIG. 6 is a flow-diagram illustrating an implementation of a method of operation for robotic system including an end-effector.

FIG. 6 shows method 600 executable by a controller, such as circuitry or at least one hardware processor, for operation in a robotic system. Method 600, in part, shows how a controller may be presented with data related to the operation of an end-effector and use the data to further operate the end-effector. Those of skill in the art will appreciate that other acts may be included, removed, and/or varied or performed in a different order to accommodate alternative implementations. Method 600 is described as being performed by a controller, for example, a control subsystem or processor(s) in computer system 106 or system 300, in conjunction with other components, such as those found in, system 100, computer system 106, robot 200, system 300, device 400, and device 500. However, method 600 may be performed by multiple controllers or by another system.

For performing part or all of method 600, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable storage devices. For performing part or all of method 600 one or more robots may be included in the operation of a robotic system. Exemplary robots and components are described herein.

Method 600 begins at 601, for example, in response to an invocation by the controller.

At 602, the controller causes the end-effector to at least attempt to close on an item. The controller may execute processor-executable instructions, and in response to the execution, cause an end-effector, such as, end-effector 407, to close on or otherwise releasably engage an item. The item may be one of a plurality of like and non-like items in defined space, e.g., input space 408. The end-effector may be physically coupled to a manipulator, e.g., disposed at the distal end of a multi-link robotic arm.

At 604, the controller receives a plurality of position values or receives position data, where the plurality of position values represents positions, e.g., angular positions, for one or more parts of an end-effector. The controller may receive the position values from one or more sensors, such as, position sensor included in the end-effector. For example, the end-effector may include a servo-motor that includes both a motor and a position sensor. In some implementations, the controller receives position values from a sensor external to end-effector or associated robot. For example, an externally mounted camera.

The plurality of position values corresponds to the operation of one or more end-effectors, and represent positions of two or more parts of the end-effector relative to each other. For example, the plurality of position values could include relative positions of two or more robotic fingers able to make a finger pad opposition grasp. The plurality of position values could include angular positions. For example, the plurality of position values could include relative positions of one or more fingers relative to a palm in an end-effector able to make a palm opposition grasp, for instance as detected in images and, or, via a position encoder (e.g., rotary position encoder). The plurality of position values could include one or more finger angles, actuator positions, or the like. The plurality of position values could include processor-readable information that represents relative position of an end-effector prior to and during operations like flexion, extension, abduction, and adduction.

At 606, the controller receives a plurality of velocity values where the plurality of velocity values represents speed or velocity data, e.g., angular velocity, for one or more parts of an end-effector. For example, the velocity data can be change in angle over time between two fingers an end-effector, one finger and a rest, and the like. The controller may receive the velocity values from one or more sensors such as sensors included in the end-effector. In some implementations, the controller receives velocity values from a sensor external to end-effector or associated robot.

In some implementations, the controller receives a plurality of position values, a plurality of time values, and creates a plurality of velocity values. In some implementations, the controller receives a plurality of velocity values, a plurality of time values (e.g., each time value is associated with a velocity value), and information that represents a known position value, and then creates a plurality of positions values. For example, the controller integrates the plurality of velocity values using methods such as Gaussian quadrature, Fejér quadrature, and the like. The controller may receive the plurality of position values as processor-readable information. Additionally, or alternatively, the controller may receive one or more acceleration values from one or more acceleration sensors (e.g., one axis or three axis accelerometers) mounted on or carried by various portions of the robotic end-effector.

At 608, the controller determines a grasp type that has occurred based on the plurality of velocity values and the plurality of position values. For example, controller selects a first grasp type from a set of possible grasp types when a first velocity value included in the plurality of velocity values is below a first threshold value.

At 610, the controller generates (e.g., creates) a grasp type signal that includes information that represents the first grasp type. The controller may send the grasp type signal through a communication channel. The controller may use the grasp type signal to update a processor-readable storage device with the information that represents the first grasp type.

Method 600 ends at 611, for example after one or more acts in method 600 such as act 610.

Figure 7:
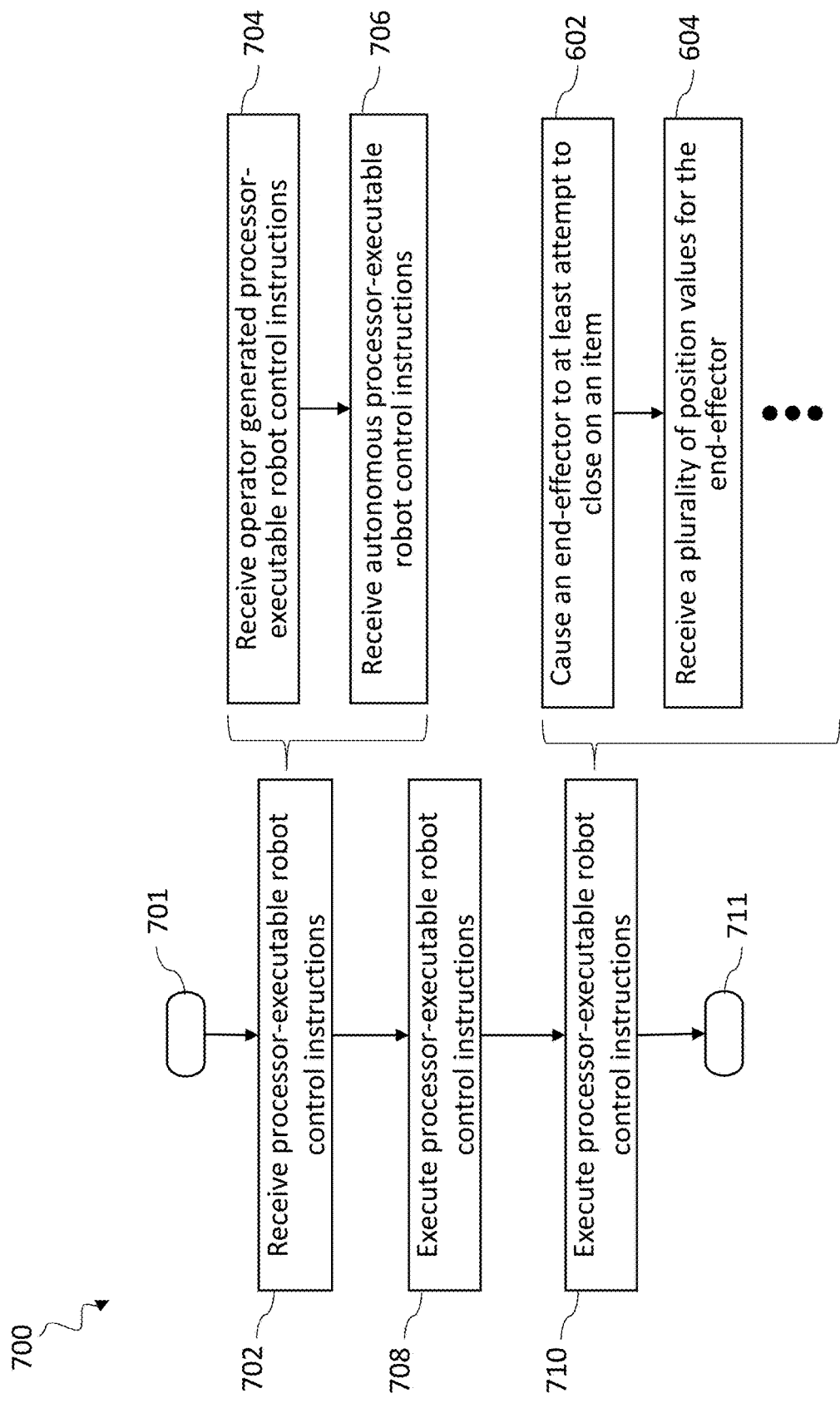
FIG. 7 is a flow-diagram illustrating an implementation of a method of operation for robotic system including an end-effector.

FIG. 7 shows method 700 executable by a controller, such as circuitry or at least one hardware processor, for operation in a robotic system. Method 700, in part, shows how a controller may process data representative of a position, orientation, movement, and, or pose of an end-effector or portions thereof. Those of skill in the art will appreciate that other acts may be included, removed, and/or varied or performed in a different order to accommodate alternative implementations. Method 700 is described as being performed by a controller, for example, a control subsystem or processor(s) in computer system 106 or system 300, in conjunction with other components, such as those found in, system 100, computer system 106, robot 200, system 300, device 400, and device 500. However, method 700 may be performed by multiple controllers or by another system.

Method 700 begins at 701, for example, in response to an invocation by the controller.

At 702, the controller receives processor-executable robot control instructions. The processor-executable robot control instructions, when executed, cause a robot to at least attempt to perform at least one action or task.

In some implementations, a robot is in communication with an operator interface. For example, robot 102-1 is communicatively coupled to operator interface 104. The controller at 704 may receive from the operator interface operator generated processor-executable robot control instructions which, when executed, cause the robot to perform at least one action.

At 706, the controller may receive autonomous processor-executable robot control instructions which, when executed, cause the robot to perform at least action. For example, the controller may be receive the autonomous processor-executable robot control instructions from a storage device in response to a request for the autonomous processor-executable robot control instructions from the controller or another agent.

A robot may be a human operator controllable robot, autonomous robot with on-board or off-board control, autonomous robot controlled by a non-human operator, and hybrid robot (i.e., partially autonomous, partially piloted. In some instances, a robot, such as one of robots 102, may be controlled autonomously at one time, while being piloted, operated, or controlled by a human operator at another time. That is, operate under an autonomous control mode and change to operate under a piloted mode (i.e., non-autonomous). Further examples of different control modes are described herein at, at least, FIG. 1.

In some implementations, a robot is in communication with an observer interface. For example, robot 102-1 is communicatively coupled to observer interface 160. The controller at 708 may receive from the observer interface observer generated processor-readable information that represents a pose for the end-effector. For example, the observer may provide information that represents a grasp location on an item.

At 710, the controller executes the processor-executable robot control instructions. The controller may perform one parts of method 600. For example, the controller may, at 602, cause the end-effector to close on an item. The controller may, at 602, cause the end-effector to attempt to close on an item. As well, the controller may, at 604, receive a plurality of position values for one or more parts of the end-effector.

Method 700 ends at 711 until invoked again.

Figure 8:
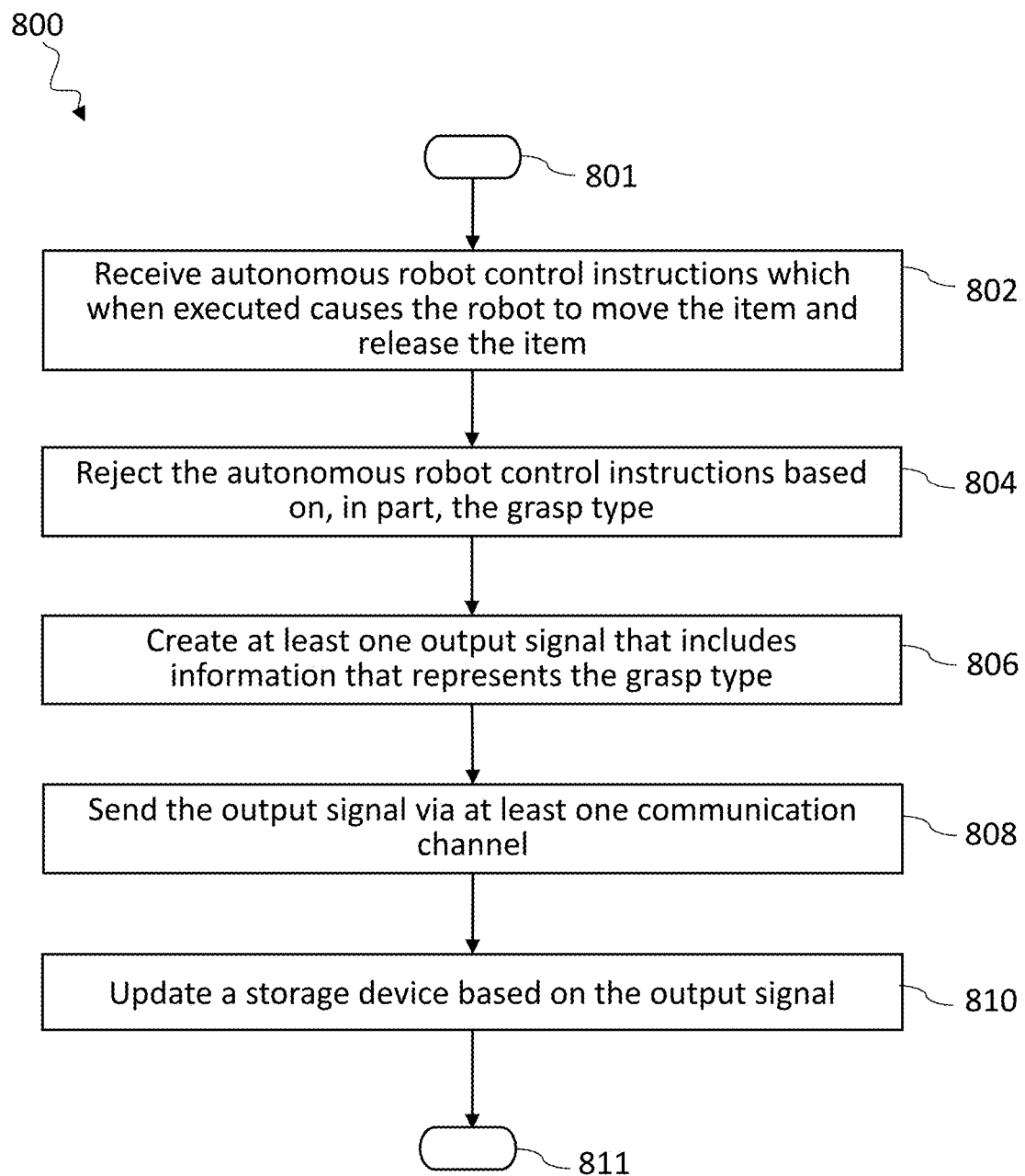
FIG. 8 is a flow-diagram illustrating an implementation of a method of operation for robotic system including an end-effector.

FIG. 8 shows method 800 executable by a controller, such as circuitry or at least one hardware processor, for operation in a robotic system. Method 800, in part, shows how a controller may process data from an end-effector. Those of skill in the art will appreciate that other acts may be included, removed, and/or varied or performed in a different order to accommodate alternative implementations. Method 800 is described as being performed by a controller, for example, a control subsystem or processor(s) in computer system 106 or system 300, in conjunction with other components, such as those found in, system 100, computer system 106, robot 200, system 300, device 400, and device 500. However, method 800 may be performed by multiple controllers or by another system.

Method 800 begins at 801, for example, in response to an invocation by the controller. For example, method 800 may begin after one or more acts in methods 600 or 700 that include act 602 and act 608.

At 802, the controller receives processor-executable robot control instructions. The processor-executable robot control instructions, when executed, cause a robot to move the item and release the item. That is move and release the item the controller caused the end-effector to close on in 602, described above in relation to FIG. 6 and FIG. 7. The processor-executable robot control instructions may be instructions generated in a piloted mode, autonomous mode, replay mode, and the like. Different modes of operation in a robotic system are described herein in relation to, at least, FIG. 1.

At 804, the controller rejects the robot control instructions based on, in part, the particular grasp type that results from execution of the robot control instructions. For example, the controller rejects the robot control instructions based on, in part, a previously selected grasp type. The controller may reject the robot control instructions based on, in part, the grasp type and information about the item. The controller may reject the robot control instructions because the end-effector has grasped the item in an unsuitable place, as indicated by the collected values that represent the position, orientation, movement, and, or pose of an end-effector or portions thereof.

At 806, the controller generates an output signal that includes processor-readable information that comprises the grasp type. The processor-readable information may further comprise information about the item.

At 808, the controller may send the output signal through a communication channel. For example, the controller sends the output signal via the network or non-network communication channel 108.

At 810, the controller may use the output signal to update a processor-readable storage device with the processor-readable information that comprises the grasp type. For example, the controller uses the output signal to update the nontransitory computer- and processor-readable storage device 110.

Method 800 ends at 811 until invoked again.

Figure 9:
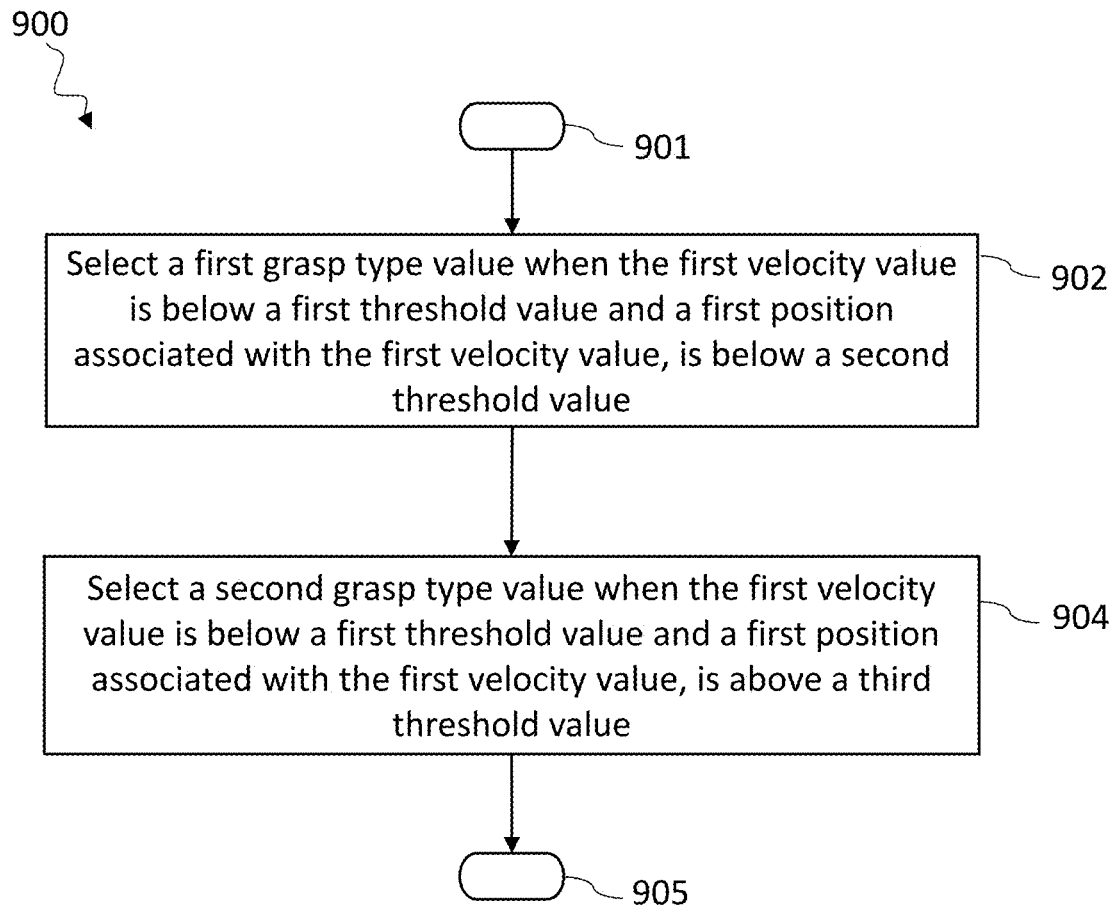
FIG. 9 is a flow-diagram illustrating an implementation of a method of operation for robotic system including an end-effector.

FIG. 9 shows method 900 executable by a controller, such as circuitry or at least one hardware processor, for operation in a robotic system. Method 900, in part, shows how a controller may select a grasp type. Those of skill in the art will appreciate that other acts may be included, removed, and/or varied or performed in a different order to accommodate alternative implementations. Method 800 is described as being performed by a controller, for example, a control subsystem or processor(s) in computer system 106 or system 300, in conjunction with other components, such as those found in, system 100, computer system 106, robot 200, system 300, device 400, and device 500. However, method 900 may be performed by multiple controllers or by another system.

Method 900 begins at 901, for example, in response to an invocation by the controller. For example, method 800 may begin after one or more acts in methods 600 or 700 for example as part of act 608.

At 902, the controller selects a first grasp type value as the grasp type when the first velocity value included in the plurality of velocity values is below the first threshold value and a first position value included in the plurality of position values, associated with the first velocity value, is below a second threshold value. For example, the end-effector is no longer closing (e.g., near zero actuator velocity) and end-effector is nearly fully closed (e.g., near zero actuator position).

At 904, the controller selects a second grasp type value as the grasp type when the first velocity value included in the plurality of velocity values is below the first threshold value and a first position value included in the plurality of position values, associated with the first velocity value, is above a third threshold value. For example, the end-effector is no longer closing (e.g., near zero actuator velocity) and end-effector is nearly not closed (e.g., at a non-zero actuator position). In some implementations, the second threshold value and the third threshold value are the same.

Method 900 ends at 905 until invoked again.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or combinations thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs (i.e., processor-executable instructions) executed by one or more processor-based devices (e.g., as one or more sets of processor-executable instructions running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any nontransitory computer-readable storage medium, e.g., memory or disk, for use by or in connection with any processor-related system or method. In the context of this specification, a "computer-readable storage medium" is one or more tangible nontransitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a robot including an end-effector;
at least one sensor;
at least one processor communicatively coupled to the end-effector and the at least one sensor; and
at least one nontransitory processor-readable storage device communicatively coupled to the at least one processor and which stores processor-executable instructions which, when executed by the at least one processor, cause the at least one processor to:
cause the end-effector to at least attempt to close on an item;
receive a plurality of position values for the end-effector from the at least one sensor;
receive a plurality of velocity values for the end-effector, wherein a respective velocity value included in the plurality of velocity values is associated with a respective position value included in the plurality of position values;
determine a grasp type in response to a first velocity value included in the plurality of velocity values being below a first threshold value; and
create at least one output signal that includes information that represents the determined grasp type.

2. The system of claim 1 wherein the velocity data for the end-effector is received from the at least one sensor.

3. The system of claim 1 further comprising a manipulator physically coupled to the end-effector.

4. The system of claim 1 further comprising:
an operator interface communicatively coupled to the at least one processor; and
wherein, when executed, the processor-executable instructions further cause the at least one processor to:
receive, at the robot from the operator interface, operator generated processor-executable robot control instructions which, when executed, cause the robot to perform an action.

5. The system of claim 1 wherein, when executed, the processor-executable instructions further cause the at least one processor to:
receive, at the robot, autonomous processor-executable robot control instructions which, when executed, cause the robot to perform an action.

6. The system of claim 1 further comprising:
an observer interface communicatively coupled to the at least one processor; and
wherein, when executed, the processor-executable instructions further cause the at least one processor to:
receive, at the robot from the observer interface, observer generated processor-readable information that represents a pose for the end-effector.

7. The system of claim 1 further comprising:
a communication channel communicatively coupled to the at least one processor; and
wherein, when executed, the processor-executable instructions further cause the at least one processor to:
send the at least one output signal that includes information that represents an action for the robot to preform via the communication channel.

8. The system of claim 1 wherein, when executed, the processor-executable instructions further cause the at least one processor to:
receive autonomous robot control instructions which when executed cause the robot to move the item and release the item.

9. The system of claim 8 wherein, when executed, the processor-executable instructions further cause the at least one processor to:
reject the autonomous robot control instructions based on the grasp type.

10. The system of claim 1 wherein to determine the grasp type in response to the first velocity value included in the plurality of velocity values being below the first threshold value, when executed, the processor-executable instructions cause the at least one processor to:
select a first grasp type value for the grasp type when the first velocity value included in the plurality of velocity values is below the first threshold value and a first position value included in the plurality of position values, associated with the first velocity value, is below a second threshold value; and
select a second grasp type value for the grasp type when the first velocity value included in the plurality of velocity values is below the first threshold value and the first position value included in the plurality of position values, associated with the first velocity value, is above a third threshold value.

11. A method of operation for a system including at least one processor, at least one sensor in communication with the at least one processor, and a robot including an end-effector in communication with the at least one processor, the method comprising:
causing, by the at least one processor, the end-effector to at least attempt to close on an item;
receiving, by the at least one processor, a plurality of position values for the end-effector from the at least one sensor;
receiving, by the at least one processor, a plurality of velocity values for the end-effector, wherein a respective velocity value included in the plurality of velocity values is associated with a respective position value included in the plurality of position values;
determining, by the at least one processor, a grasp type in response to a first velocity value included in the plurality of velocity values being below a first threshold value; and
creating at least one output signal that includes information that represents the grasp type.

12. The method of claim 11 further comprising:
receiving, by the last least one processor, the velocity data for the end-effector from the at least one sensor.

13. The method of claim 11 wherein the system further includes a manipulator physically coupled to the end-effector, the method further comprising:
causing, by the last least one processor, the end-effector to change a location via the manipulator.

14. The method of claim 11 wherein the system further includes an operator interface in communication with the at least one processor, the method further comprising:
receiving, at the robot from the operator interface, operator generated processor-executable robot control instructions which, when executed, cause the robot to perform an action.

15. The method of claim 11 further comprising:
receiving, at the robot, autonomous processor-executable robot control instructions which, when executed, cause the robot to perform an action.

16. The method of claim 11 wherein the system further includes an observer interface in communicatively with the at least one processor; and, the method further comprises:
receiving, at the robot from the observer interface, observer generated processor-readable information that represents a pose for the end-effector.

17. The method of claim 11 wherein the system further includes a communication channel communicatively coupled to the at least one processor; and the method further comprises:
causing, by the at least one processor, the at least one output signal to be sent via the communication channel.

18. The method of claim 11 further comprising:
receiving, at the at least one processor, robot control instructions which when executed cause the robot to perform at least one action.

19. The method of claim 18 further comprising:
rejecting, by the at least one processor, the robot control instructions which when executed cause the robot to perform at least one action.

20. The method of claim 11 wherein determining, by the at least one processor, the grasp type in response to the first velocity value included in the plurality of velocity values being below the first threshold value comprises:
selecting, by the at least one processor, a first grasp type value for the grasp type when the first velocity value included in the plurality of velocity values is below the first threshold value and a first position value included in the plurality of position values, associated with the first velocity value, is below a second threshold value; or
selecting, by the at least one processor, a second grasp type value for the grasp type when the first velocity value included in the plurality of velocity values is below the first threshold value and the first position value included in the plurality of position values, associated with the first velocity value, is above a third threshold value.

* * * * *